United States Patent [19]
Liu

[11] Patent Number: 5,948,987
[45] Date of Patent: Sep. 7, 1999

[54] ROTATIONAL SHOCK FIXTURE

[76] Inventor: Hong S. Liu, 284 Moraga Way, San Jose, Calif. 95119

[21] Appl. No.: 08/882,553

[22] Filed: Jun. 25, 1997

Related U.S. Application Data

[63] Continuation-in-part of application No. 08/667,094, Jun. 20, 1996, Pat. No. 5,644,087.

[51] Int. Cl.[6] ........................................... B06B 3/00
[52] U.S. Cl. ........................... 73/663; 73/865.3; 73/432.1
[58] Field of Search .............................. 73/663, 664, 665, 73/666, 667, 668, 672, 571, 865.3, 865.6, 432.1, DIG. 1

[56] References Cited

U.S. PATENT DOCUMENTS

| | | | |
|---|---|---|---|
| 2,697,343 | 12/1954 | Hirtreiter | 73/663 |
| 3,372,572 | 3/1968 | Campbell et al. | 73/633 |
| 3,429,175 | 2/1969 | Real, Jr. et al. | 73/663 |
| 4,061,019 | 12/1977 | Blasetti | 73/662 |
| 4,265,123 | 5/1981 | Cappel | 73/663 |
| 4,385,524 | 5/1983 | Cappel | 73/663 |
| 4,446,742 | 5/1984 | Thompson, Jr. et al. | 73/663 |
| 4,875,374 | 10/1989 | Pinson | 73/663 |
| 5,309,766 | 5/1994 | Tonzeau et al. | 73/663 |
| 5,804,733 | 9/1998 | Karita et al. | 73/644 |

FOREIGN PATENT DOCUMENTS

| 426159 | 10/1974 | U.S.S.R. | 73/663 |
|---|---|---|---|

*Primary Examiner*—Michael Brock
*Assistant Examiner*—Rose M. Miller
*Attorney, Agent, or Firm*—Donald E. Schreiber

[57] ABSTRACT

A rotational shock fixture, energized by an impulsive driver, applies a rotary shock to a device undergoing test. A rotatable device-mounting-plate, enclosed within a rigid box, receives the device. A pair of diametrically opposed bearings support the box within a frame for movement about a rotation axis. A brake, coupled to the rotatable device-mounting-plate abruptly stops the rotatable device-mounting-plate from whirling about the rotation axis thereby applying the rotary shock to the device. Optional coil springs, stretching between the box and the frame, establish a rest orientation for the box with respect to the frame, and dampens oscillations of the box.

16 Claims, 5 Drawing Sheets

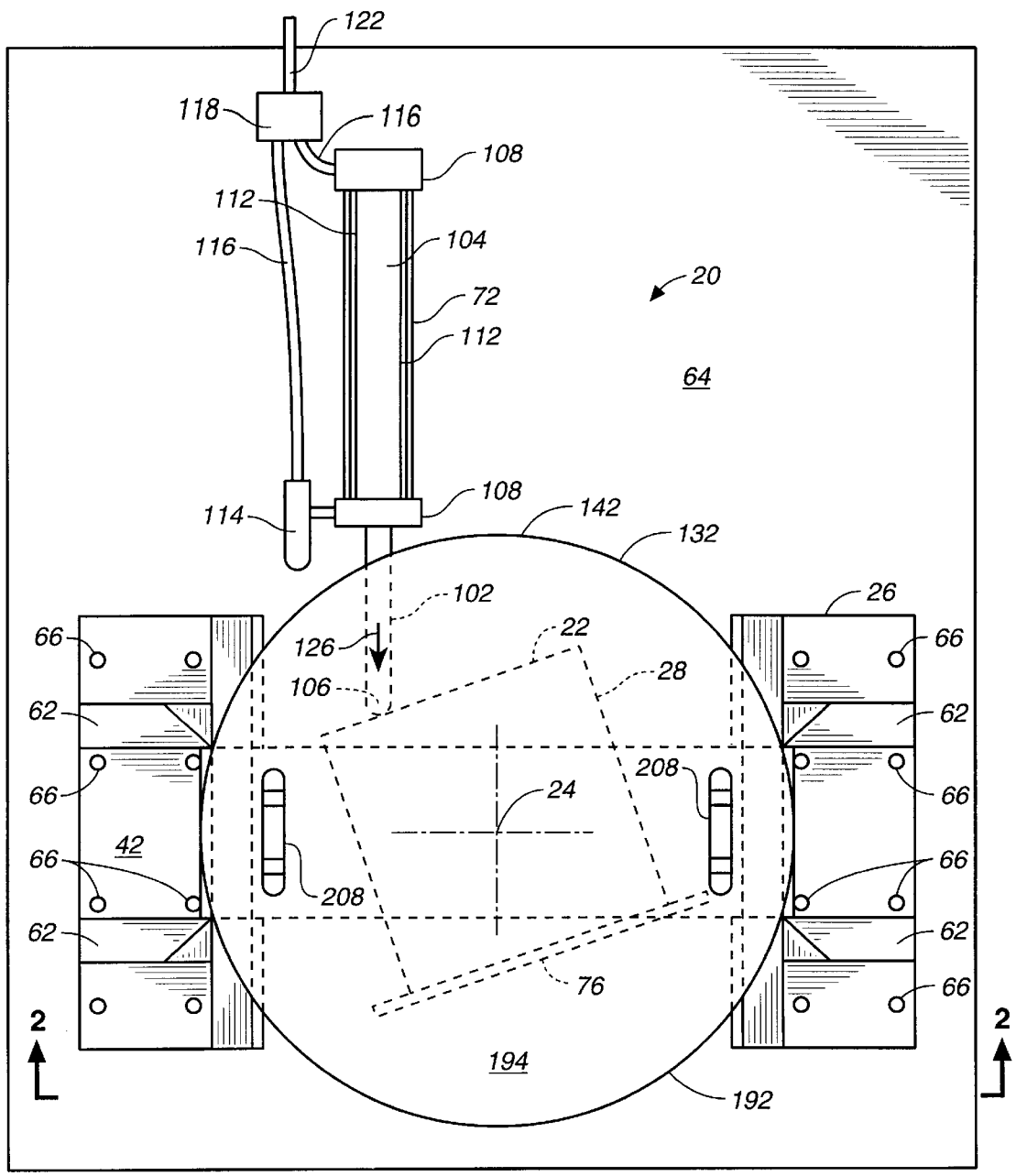
FIG._1

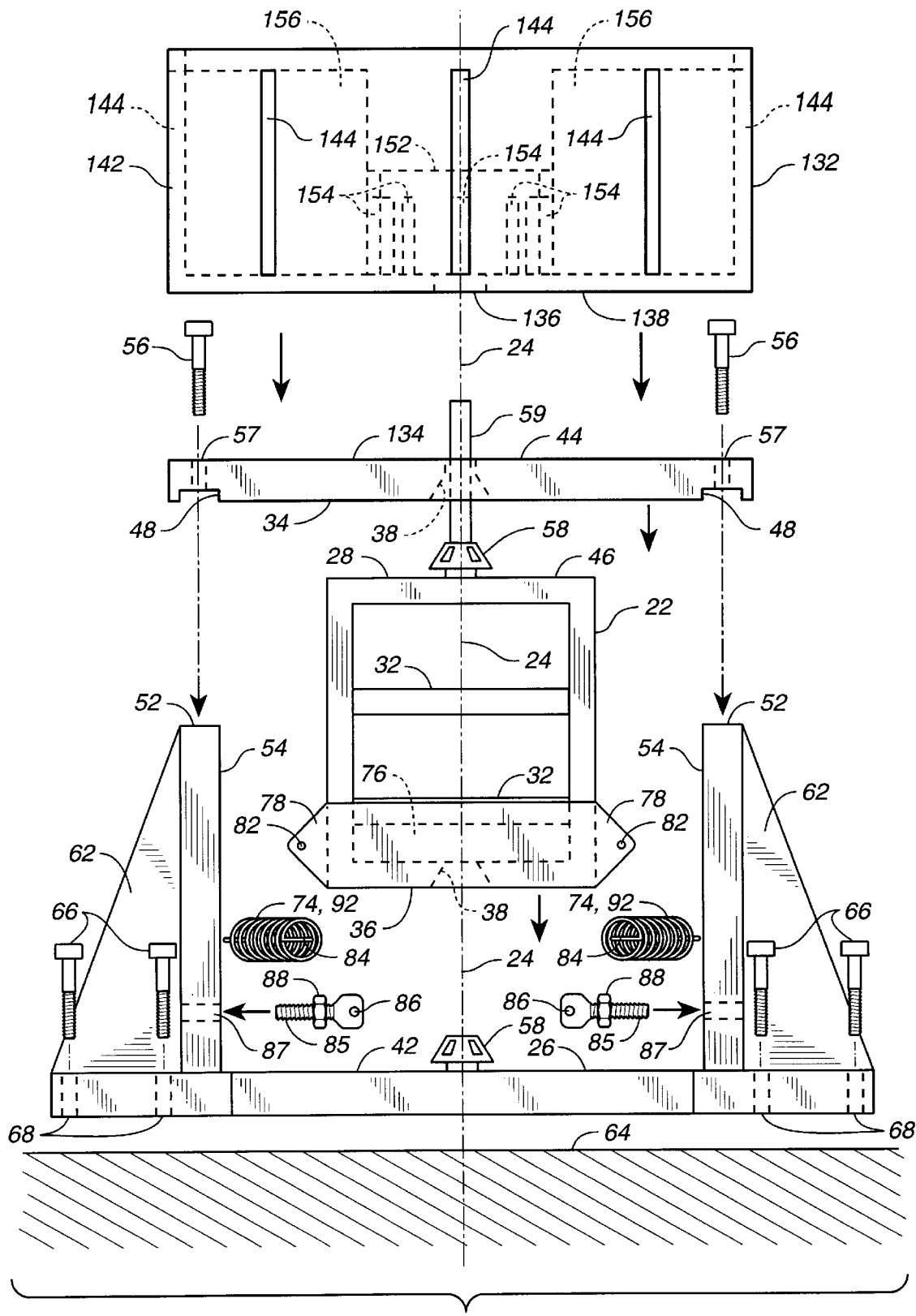
FIG._2A

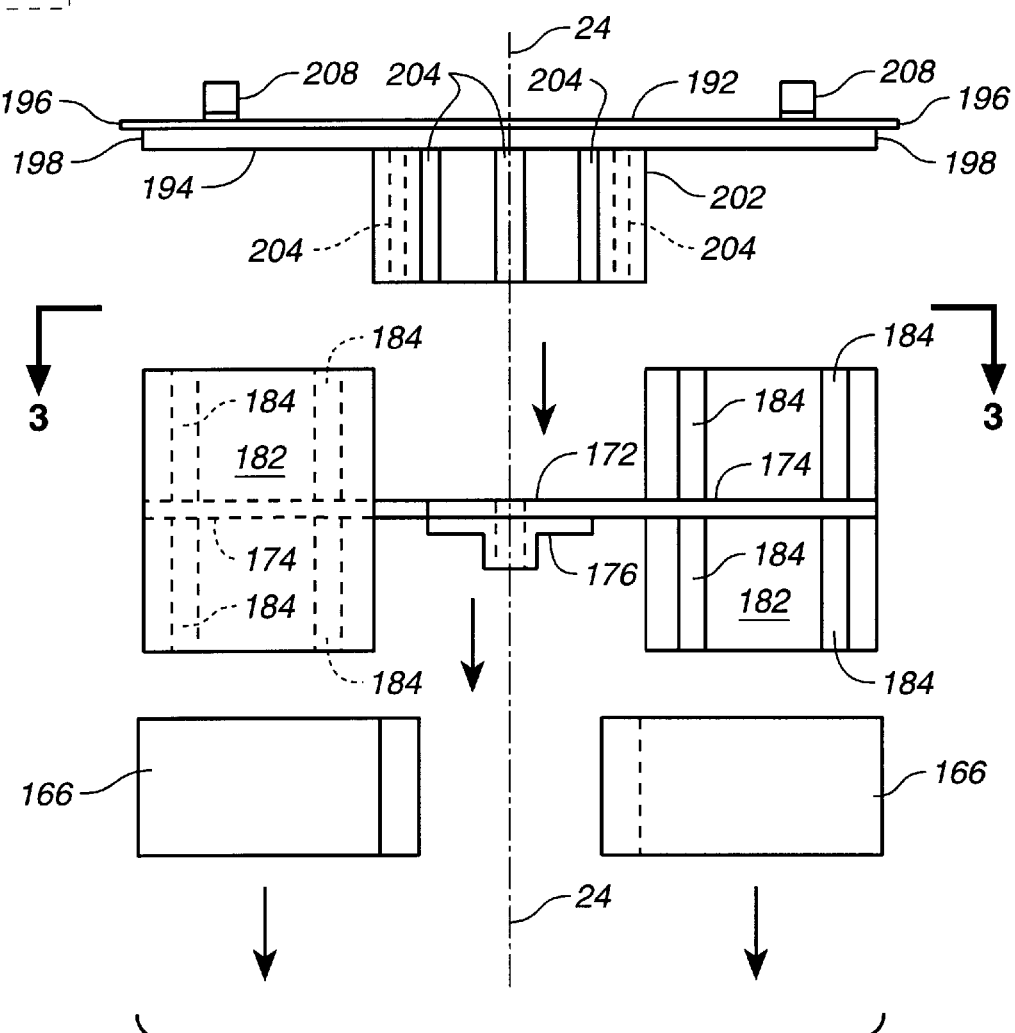

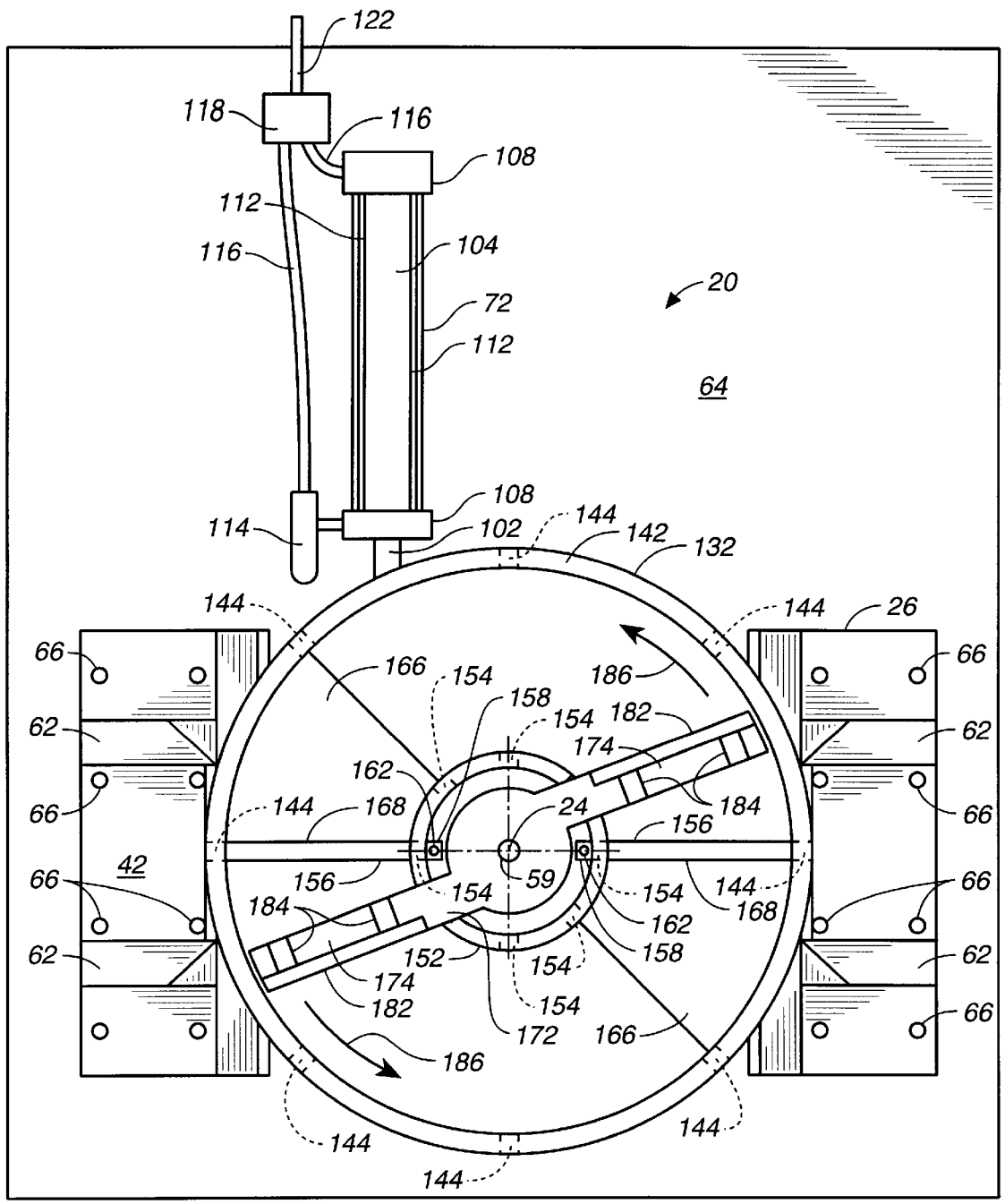
FIG._3

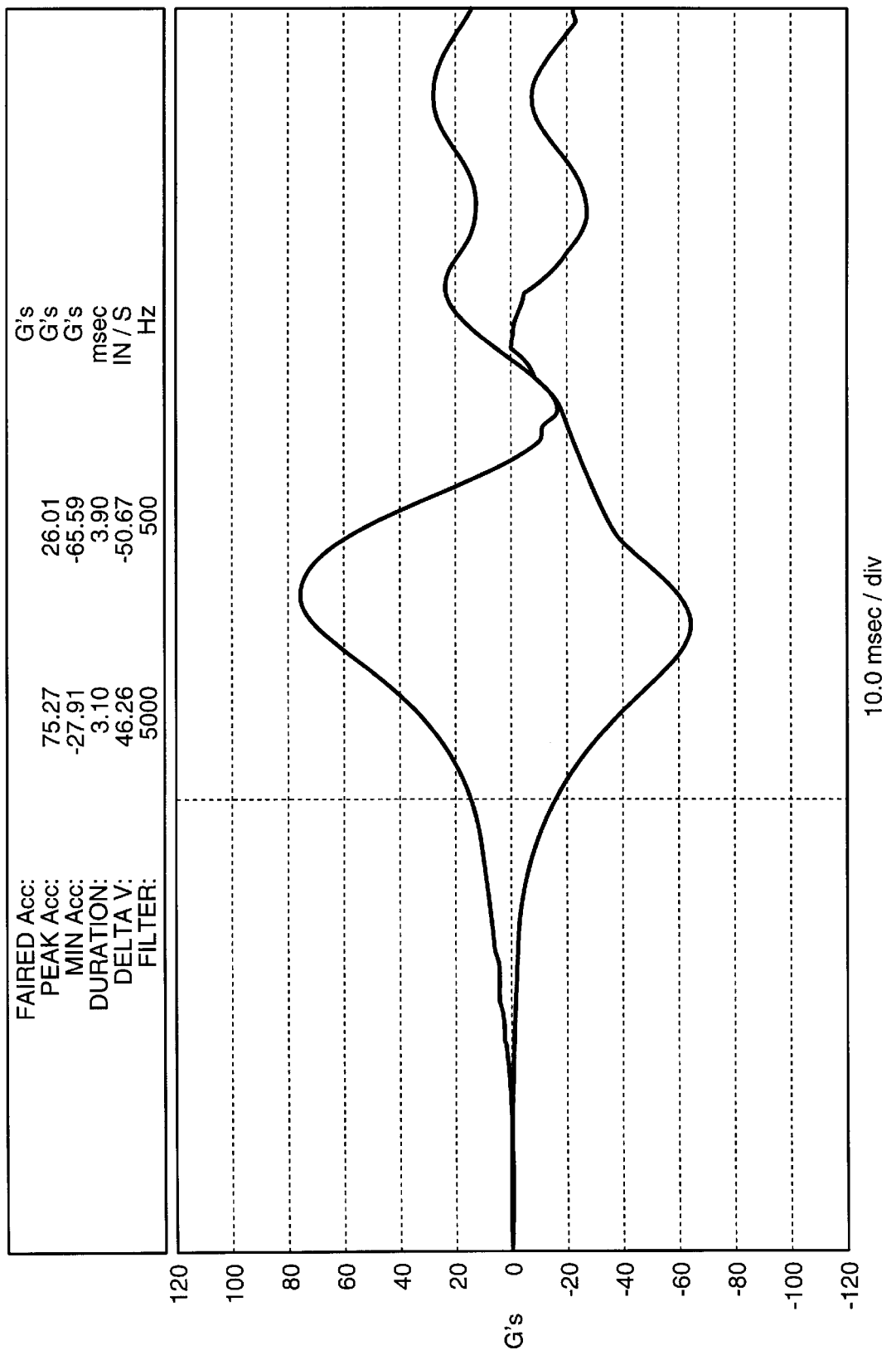
FIG._4

ROTATIONAL SHOCK FIXTURE

Continuation-in-part of Ser. No. 08/667,094 filed Jun. 20, 1996, that issued Jul. 1, 1997, as U.S. Pat. No. 5,644,087.

BACKGROUND OF THE INVENTION

1. Field of the Invention

The present invention relates generally to environmental testing and, more particularly, to fixtures used in shock testing.

2. Description of the Prior Art

Rectilinear shock and vibration testing of devices to assure operation in their intended environment is a well established industrial practice. In performing such shock and vibration testing, generally a device is secured to a fixture that is mechanically coupled to a source of either impulsive or vibratory rectilinear motion, e.g. a pneumatically, electromagnetically or hydraulically energized shaker driver. Recently, however, manufacturers have become concerned that rotational shock, as contrasted with rectilinear shock and/or vibration, may cause certain types of device failures, particularly for digital computer disk drives.

Presently, it appears that there exist several different commercial systems for applying a rotational shock to a device under test. One type of rotational shock system employs a spring-loaded plunger which, upon being released, strikes a pivoted plate to which is secured the device undergoing test. An alternative type of rotational shock system employs a plate that pivots about a horizontal axis to which is secured the device undergoing test. When released, the plate rotates downward until hitting a mechanical stop. The advantages of such rotational shock testing devices are that they are relatively simple to design, and they are relatively inexpensive. However, these different types of rotational shock testing devices have several disadvantages. First, it is difficult to control the strength of the applied shock, and therefore the systems exhibit poor repeatability. Second, the systems are capable of applying only a relatively weak shock having a short duration that is difficult to adjust or control.

SUMMARY OF THE INVENTION

An object of the present invention is to provide an apparatus that provides a well controlled rotational shock to a device undergoing test.

Another object of the present invention is to repeatably shock a device undergoing test.

Another object of the present invention is to provide rotational shock to a device undergoing test which has an adjustable range of characteristics, such as duration and strength, and to repeatably perform such testing.

Another object of the present invention is to provide high angular acceleration shock or to a device undergoing test.

Yet another object of the present invention is to adapt an impulsive rectilinear driver for applying rotational shock to a device undergoing test.

Briefly, the present invention is a rotational shock fixture that adapts an impulsive driver for applying a rotary shock to a device undergoing test. The rotational shock fixture includes a rotatable device-mounting-plate that receives the device to be tested. The rotatable device-mounting-plate is supported for movement about an axis of rotation that is fixed with respect to an impulsive driver that whirls the device-mounting-plate about the axis of rotation. A brake coupled to the rotatable device-mounting-plate abruptly stops the device-mounting-plate from whirling about the axis of rotation to apply the rotary shock to the device being tested.

In the preferred embodiment of the rotational shock fixture, a pneumatically energized impulsive driver produces rectilinear motion. The impulsive driver whirls the rotatable device-mounting-plate about the axis of rotation by pressing against an outer surface of the rotatable device-mounting-plate.

In the preferred embodiment of the rotational shock fixture, the brake includes elongated arms that are coupled to the device-mounting-plate for rotation about the axis of rotation in unison with the device-mounting-plate. The brake also includes a bumper which the arm impacts thereby abruptly stopping the rotatable device-mounting-plate from whirling about the axis of rotation during application of the rotary shock to the device.

In an alternative embodiment of the invention, a pair of springs coupled to the device-mounting-plate return the device-mounting-plate to a rest orientation when the device-mounting-plate is free from any externally applied force.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a plan view of a rotational shock fixture in accordance with the present invention depicting a rigid box that encloses a device-mounting-plate, a frame for supporting the box for movement about an axis of rotation, a pneumatically energized impulsive driver, and a brake for stopping the device-mounting-plate from rotating about the axis of rotation;

FIG. 2 depicts the relationship between FIGS. 2a and 2b which when combined form an exploded elevational view of the box, frame, and brake taken along the line 2—2 of FIG. 1;

FIG. 3 is a plan view taken along the line 3—3 of FIG. 2b illustrating details of the brake included in the rotational shock fixture; and FIG. 4 is a graph illustrating performance of the rotational shock fixture illustrated in FIGS. 1–3.

DETAILED DESCRIPTION OF THE PREFERRED EMBODIMENT

FIG. 1 depicts a rotational shock fixture in accordance with the present invention referred to by the general reference character 20. As illustrated in FIGS. 1, and 2a, the rotational shock fixture 20 includes a lightweight, rigid box 22 which is supported for movement about a rotation axis 24 by a frame 26. Internally, walls of the box 22 are fabricated from a light-weight honeycomb material (not illustrated in any of the FIGs.), and have an outer surface 28 that is formed by sheets of aluminum. As illustrated in FIG. 2a, the box 22 includes two device-mounting-plates 32 for receiving the device to be tested with rotational shock. The device-mounting-plates 32 are oriented perpendicular to the rotation axis 24.

Formed into a lower surface 34 of a removable upper plate 44 of the frame 26, and into a lower surface 36 of the outer surface 28 of the box 22 are frustro-conically shaped bearing-journal apertures 38. The bearing-journal apertures 38 are diametrically opposed from each other across the box 22. The upper plate 44 of the frame 26 and also a H-shaped base 42 are formed from one and one-half (1½) inch thick aluminum sheet material. Formed into the lower surface 34 of the upper plate 44 are U-shaped grooves 48 which mate with projecting upper-surfaces 52 of trapezoidally-shaped side walls 54 of the frame 26. The upper plate 44 is secured onto the projecting upper-surfaces 52 by a plurality of fasteners 56 which extend through apertures 57 piercing the upper plate 44 to thread into the side walls 54.

Projecting respectively from the base 42 and from an upper surface 46 of the box 22 about the rotation axis 24 are tapered roller-bearings 58. The tapered roller-bearing 58 interposed between the lower surface 34 of the upper plate 44 and the upper surface 46 of the box 22 encircles and is supported by a shaft 59 that is rigidly secured to the box 22, and that projects completely through the upper plate 44. Accordingly, the assembled frame 26 encircles the box 22, and supports the box 22 for movement about the rotation axis 24 on the tapered roller-bearings 58 that are respectively interposed between the box 22 and the frame 26. By appropriately spacing the upper plate 44 to provide a slight gap between the projecting upper-surfaces 52 of the side walls 54 and a mating surface of the U-shaped grooves 48, a controlled pre-load may be established on the tapered roller-bearings 58 which avoids buckling the honeycomb box 22.

To ensure rigidity of the frame 26, one and one-half (1½) inch thick aluminum side walls 54 are secured by welding to the H-shaped base 42. A pair of one and one-half (1½) inch thick aluminum, triangularly-shaped buttresses 62 are also secured by welding to each of the side walls 54 and to the base 42. The frame 26 is secured onto a base-plate 64 by a plurality of fasteners 66 which extend through apertures 68 piercing the H-shaped base 42 to thread into the base-plate 64. Securing the frame 26 to the base-plate 64 fixes the rotation axis 24 with respect to a pneumatically energized, rectilinear impulsive driver 72 illustrated in FIGS. 1 and 3.

In addition to being supported from the frame 26 by the tapered roller-bearings 58, the box 22 may also be coupled to the frame 26 by a pair of optional coil springs 74 only illustrated in FIG. 2a. To attach the coil springs 74 to the box 22, a spring plate 76 is secured on the outer surface 28 of the box 22 adjacent to the lower device-mounting-plate 32. The spring plate 76 includes diametrically opposed ears 78 that are pierced respectively by apertures 82. The apertures 82 respectively receive hooks 84 located at one end of each of the coil springs 74. Similarly, threaded studs 85 having flattened ends pierced by apertures 86 screw into one of a horizontal row of threaded apertures 87 that pierce both side walls 54. Threaded onto each threaded stud 85 is a lock nut 88 which is tightened against the side wall 54 to prevent rotation of the threaded stud 85. The apertures 86 project inward from the side walls 54 to respectively receive hooks 84 of the coil springs 74. Stretching of the coil springs 74 between the apertures 86 and the apertures 82 establishes a rest orientation for the box 22. By selecting different pairs of the threaded apertures 87 in the side walls 54 the rest orientation of the box 22 with respect to the frame 26 may be set at various different angles. The box 22 returns to this rest orientation if no external force is applied to the box 22. Each of the coil springs 74 is encircled with a dampening sheath of elastomeric material 92, preferably a rubber electrical insulating tape, to diminish vibration of the coil springs 74.

Referring again to FIG. 1, the impulsive driver 72 includes a shaft 102 that is extendable outward from and retractable into a hollow cylinder 104 included in the impulsive driver 72. An end 106 of the shaft 102 furthest from the cylinder 104 contacts the outer surface 28 of the box 22. Opposite ends of the cylinder 104 are closed by end plates 108. Four elongated rods 112, only two of which appear in FIGS. 1 and 3, stretch between the end plates 108 parallel to the cylinder 104 to hold the end plates 108 in a sealing engagement with the cylinder 104. The end plate 108 nearest the shaft 102 is connected to a acoustic muffler 114. The end plate 108 furthest from the shaft 102 and the acoustic muffler 114 are respectively connected by hollow conduits 116 to a solenoid valve 118. A single conduit 122 connects the solenoid valve 118 to a source of pneumatic pressure such as an air compressor, not illustrated in any of the FIGS. The impulsive driver 72 preferably has a bore of approximately four (4) inches, a stroke of approximately fifteen (15) inches, and operates at a pressure of one-hundred twenty (120) pounds per square inch ("psi").

Upon the application of pneumatic pressure to the cylinder 104 via the end plate 108 furthest from the shaft 102, the shaft 102 extends rectilinearly outward from the cylinder 104 as indicated by an arrow 126 in FIG. 1. Extending in this way, the shaft 102 moves along a line that is displaced to one side of the rotation axis 24 thereby pressing the end 106 against the outer surface 28 of the box 22 to whirl the device-mounting-plate 32 about the rotation axis 24. Enclosed entirely within the cylinder 104 of the impulsive driver 72, an annularly-shaped mass weighing between ten (10) and twenty (20) pounds, not depicted in any of the FIGs., encircles the shaft 102. The annularly-shaped mass smoothes acceleration which the impulsive driver 72 applies to the box 22 upon application of pneumatic pressure to the cylinder 104.

Referring now to FIGS. 1, 2a and 3, the rotational shock fixture 20 also includes a cup-shaped brake housing 132 that is rigidly fastened by screws (not illustrated in any of the FIGs.) to an upper surface 134 of the upper plate 44. When the brake housing 132 is secured to the upper plate 44, the shaft 59 projects upward through an aperture 136 that pierces a one-half (½) inch thick, disk-shaped, planar bottom wall 138 of the brake housing 132 to extend slightly beyond the middle of the brake housing 132. A cylindrically-shaped outer wall 142 of the brake housing 132 is pierced by eight (8) vertically-oriented elongated outer-wall slots 144 located at at 45° intervals around the outer wall 142. A hollow, cylindrically-shaped intermediate wall 152, that projects upward from the bottom wall 138 slightly less than one-half as high as the outer wall 142 and that is located between the outer wall 142 and the shaft 59, encircles the shaft 59. Eight (8) vertically-oriented elongated inner-wall slots 154, only six (6) of which are illustrated in FIG. 3, pierce the intermediate wall 152 at 45° intervals around the intermediate wall 152.

A pair of diametrically opposed, rectangularly-shaped braking plates 156 each span between radially aligned pairs of slots 144 and 154 to extend outward through the respective outer-wall slots 144. Each braking plate 156 has a projecting tab 158 that, during installation of the braking plate 156 into the brake housing 132, passes first through the and then through the inner-wall slot 154. A pin 162, pressed downward into each of the tabs 158, has an end that extends upward out of the tab 158 to restrain each braking plate 156 within the outer wall 142 of the brake housing 132. The pair of braking plates 156, which are one-half (½) inch thick, divide in half an annularly-shaped space within the brake housing 132 located between the outer wall 142 and the intermediate wall 152. By using various different sets of diametrically opposed pairs of slots 144 and 154, the annularly-shaped space within the brake housing 132 located between the outer wall 142 and the intermediate wall 152 may be readily divided in half at various orientations with respect to the frame 26. Alternatively, pairs of opposed slots 144 and 154 may be used to subdivide other than in half the annularly-shaped space within the brake housing 132 located between the outer wall 142 and the intermediate wall 152.

Referring now to FIGS. 2a, 2b and 3, the annularly-shaped space within the brake housing 132 located between the outer wall 142 and the intermediate wall 152 receives a pair of curved braking blocks 166. Each of the braking blocks 166 respectively contacts a side surface 168 of one of the braking plates 156. The braking blocks 166 are preferably made from a material that compresses upon application of a sufficiently strong force. A particularly preferred material for the braking blocks 166 is a resilient compressible foam material.

The rotational shock fixture 20 also includes an aluminum blade 172 that is preferably shaped symmetrically about the rotation axis 24. The blade 172 includes a pair of elongated arms 174 which extend outward from the rotation axis 24. The blade 172, which is three-quarters (¾) of an inch thick, also includes a hub 176 that encircles the shaft 59. The hub 176 rigidly secures the blade 172 to the shaft 59 so the blade 172 rotates about the rotation axis 24 in unison with the device-mounting-plates 32. Each of the elongated arms 174 includes a one-half (½) inch thick, rectangularly-shaped paddle 182 oriented parallel to the rotation axis 24 and welded along an end of the elongated arm 174 extending away from the rotation axis 24. A pair of one-half (½) inch thick aluminum, triangularly-shaped, reinforcing buttresses 184 are also secured by welding to each of the paddles 182 and to the blade 172 both above and below the blade 172.

During operation of the rotational shock fixture 20 to rotationally shock a device secured to one of the device-mounting-plates 32, the combined brake housing 132, braking plates 156, the braking blocks 166 and the blade 172 constitute a brake for abruptly stopping rotation about the rotation axis 24 both of the blade 172 and of the box 22. Accordingly, as the device-mounting-plates 32 and the blade 172 whirl in unison about the rotation axis 24 as indicated by curved arrows 186 in FIG. 3 responsive to an impulse applied to the outer surface 28 of the box 22 by the shaft 102 of the impulsive driver 72, the paddles 182 respectively impact one of the braking blocks 166 which abruptly stops rotation of the box 22 thereby applying a rotary shock to a device secured to either of the device-mounting-plates 32 located within the box 22.

The rotational shock fixture 20 also includes a disk-shaped cover 192 which is received into the brake housing 132 for enclosing the braking plates 156, braking blocks 166 and the blade 172, and for mechanically engaging and supporting edges of the braking plate 156 that project upward above the intermediate wall 152. The cover 192 includes a disk-shaped top plate 194. The top plate 194 has an encircling projecting lip 196 that rests on top of the brake housing 132 when an encircling recessed edge 198 is received into the brake housing 132. A hollow, cylindrically-shaped cover wall 202, that projects downward from the top plate 194 slightly less than one-half the depth of the outer wall 142, encircles the rotation axis 24. Eight (8) vertically-oriented elongated cover-wall troughs 204, only five (5) of which are depicted in FIG. 2b, are formed into the cover wall 202 at 45° intervals around the cover wall 202. When the cover 192 is properly disposed on the brake housing 132 with the projecting lip 196 abutting the outer wall 142, edges of the braking plates 156 projecting upward above the blade 172 are received into a diametrically opposed pair of the cover-wall troughs 204. The cover 192 also includes a pair of handles 208 secured on top of the top plate 194 to facilitate installing the cover 192 onto and removing the cover 192 from the brake housing 132.

Operating in the manner described, the rotational shock fixture 20 of the present invention is capable of applying controlled decelerational shock to the device-mounting-plates 32 having a rotational deceleration of at least 6,800 radians/sec$^2$. At a distance of approximately four and one-quarter (4.25) inches from the rotation axis 24, as illustrated in FIG. 4 such a radial deceleration applies a force that is approximately seventy-five (75) times greater than the force of gravity, i.e. 75 g's, to a device under test.

Although the present invention has been described in terms of the presently preferred embodiment, it is to be understood that such disclosure is purely illustrative and is not to be interpreted as limiting. For example, while a pair of coil springs 74 respectively stretching between ears 78 of the box 22 and threaded studs 85 of the frame 26 have been disclosed for establishing the rest orientation of the box 22 with respect to the frame 26, a rotary coil spring, which encircles one of the tapered roller-bearings 58 and which engages the box 22 at one end and the frame 26 at an opposite end, could also be used for establishing the rest orientation of the box 22. While the rotational shock fixture 20 is preferably used with a pneumatic impulsive driver 72, the rotational shock fixture 20 may also be used with an electromagnetically or hydraulically energized impulsive driver. Analogously, other mechanical brakes in which a moving member rotates about the rotation axis 24 in unison with the device-mounting-plates 32 may be used for abruptly stopping rotation of the box 22. For example, a drum brake in which a rotor frictionally engages the outer wall 142 of the brake housing 132, or a pneumatically operated disk brake may be used for abruptly stopping rotation of the box 22. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A rotational shock fixture that adapts an impulsive driver for applying a rotary shock to a device undergoing test, the rotational shock fixture comprising:

a rotatable device-mounting-plate for receiving the device to be tested, said device-mounting-plate being supported for movement about an axis of rotation that is fixed with respect to the impulsive driver, and is oriented perpendicular to the device, said device-mounting-plate being adapted to be whirled about the axis of rotation by the impulsive driver; and a brake coupled to said device-mounting-plate for abruptly stopping said device-mounting-plate from whirling about the axis of rotation, whereby abruptly stopping said device-mounting-plate from whirling applies the rotary shock to the device.

2. The rotational shock fixture of claim 1 wherein the impulsive driver produces rectilinear motion and whirls said device-mounting-plate about the axis of rotation by pressing against an outer surface of said device-mounting-plate.

3. The rotational shock fixture of claim 1 wherein said brake includes:

a moving member rigidly coupled to said device-mounting-plate for rotation about the axis of rotation in unison with said device-mounting-plate; and a mechanical brake means which engages the moving member during application of the rotary shock to the device for abruptly stopping said device-mounting-plate from whirling about the axis of rotation.

4. The rotational shock fixture of claim 3 wherein:

the moving member includes an elongated arm; and the mechanical brake means includes a bumper which the arm impacts during application of the rotary shock to the device.

5. The rotational shock fixture of claim 4 wherein:

the arm includes a paddle disposed along an end of the arm extending away from the axis of rotation; and the bumper includes a block of compressible material impacted by the paddle.

6. The rotational shock fixture of claim 5 wherein the compressible material is a resilient material.

7. The rotational shock fixture of claim 1 wherein said device-mounting-plate includes a rigid box, said box being supported for movement about the axis of rotation which remains fixed with respect to the impulsive driver.

8. The rotational shock fixture of claim 7 wherein said box has an outer surface against which the impulsive driver presses when whirling said device-mounting-plate about the axis of rotation.

9. The rotational shock fixture of claim 7 wherein diametrically opposite sides of the outer surface of said box are respectively supported for rotation about the axis of rotation by bearings that are carried by a rigid frame which encircles said box, said bearings being respectively interposed between the diametrically opposite sides of the outer surface of said box and said frame.

10. The rotational shock fixture of claim 9 wherein said bearings are tapered-roller bearings.

11. The rotational shock fixture of claim 9 wherein said box is also coupled to said frame by spring means for establishing a rest orientation of said box with respect to said frame, said box returning to the rest orientation when free from an externally applied force.

12. The rotational shock fixture of claim 11 wherein said spring means includes a pair of coil springs respectively stretched between opposite sides of said box and opposite sides of said frame.

13. The rotational shock fixture of claim 12 wherein each of said coil springs include a vibration dampener for diminishing vibration of said coil spring.

14. The rotational shock fixture of claim 13 wherein said vibration dampener includes an elastomeric sheath encircling said coil spring.

15. The rotational shock fixture of claim 1 further comprising the impulsive driver.

16. The rotational shock fixture of claim 15 wherein the impulsive driver includes a pneumatically energized cylinder.

* * * * *